United States Patent
Chung et al.

(10) Patent No.: US 9,402,528 B2
(45) Date of Patent: Aug. 2, 2016

(54) DISH WASHER HAVING A HEAT EXCHANGE PASSAGE

(75) Inventors: Moon Kee Chung, Changwon-si (KR); Kyung Hwa Park, Changwon-si (KR); Yong Jin Choi, Changwon-si (KR); Tae Hee Lee, Changwon-si (KR); Young Hwan Park, Changwon-si (KR); Hyo Seon Jang, Changwon-si (KR); Sang Heon Yoon, Changwon-si (KR); Jae Chul Lee, Changwon-si (KR)

(73) Assignee: LG Electronics Inc., Seoul (KR)

( * ) Notice: Subject to any disclaimer, the term of this patent is extended or adjusted under 35 U.S.C. 154(b) by 1045 days.

(21) Appl. No.: 13/149,149

(22) Filed: May 31, 2011

(65) Prior Publication Data
US 2011/0290284 A1    Dec. 1, 2011

(30) Foreign Application Priority Data

Jun. 1, 2010  (KR) .................. 10-2010-0051610
Jun. 1, 2010  (KR) .................. 10-2010-0051614
Jun. 1, 2010  (KR) .................. 10-2010-0051621

(51) Int. Cl.
*A47L 15/42*    (2006.01)

(52) U.S. Cl.
CPC ......... *A47L 15/4219* (2013.01); *A47L 15/4206* (2013.01); *A47L 15/4208* (2013.01); *A47L 15/4225* (2013.01); *A47L 15/4291* (2013.01); *A47L 2401/20* (2013.01); *A47L 2501/02* (2013.01); *A47L 2501/03* (2013.01); *A47L 2501/05* (2013.01); *Y02B 40/46* (2013.01)

(58) Field of Classification Search
CPC ............ A47L 15/4287; A47L 15/4219; A47L 15/4225; A47L 15/4291
USPC ................................................ 134/104.2, 105
See application file for complete search history.

(56) References Cited

U.S. PATENT DOCUMENTS

| | | | | |
|---|---|---|---|---|
| 4,156,621 | A | * | 5/1979 | Andrews et al. ................. 134/10 |
| 4,326,551 | A | * | 4/1982 | Voorhees .................... 134/58 D |
| 5,660,193 | A | * | 8/1997 | Archer ................ A47L 15/4285 134/105 |
| 5,829,459 | A | * | 11/1998 | Milocco et al. ............. 134/57 D |
| 2005/0241683 | A1 | * | 11/2005 | Jeong .................. A47L 15/4223 134/58 D |

(Continued)

FOREIGN PATENT DOCUMENTS

| | | |
|---|---|---|
| DE | 36 09 277 A1 | 9/1987 |
| DE | 39 01 169 A1 | 7/1990 |
| DE | 44 03 737 A1 | 8/1995 |

(Continued)

OTHER PUBLICATIONS

English Machine Translation of Description of WO-2008138308-A1 (Schrott et al. 2008).*

(Continued)

*Primary Examiner* — David Cormier
*Assistant Examiner* — Irina Graf
(74) *Attorney, Agent, or Firm* — KED & Associates LLP

(57) ABSTRACT

A dish washer is provided that includes a tub that defines a space for washing dishes, a water supply unit that has a water chamber where water supplied from the outside collects, to wash the dishes, a sump that is supplied with water from the water chamber and supplies wash water into the tub, and a heat exchange passage through which the wash water in the sump flows and exchanges heat with the water in the water chamber while flowing.

12 Claims, 19 Drawing Sheets

(56) References Cited

U.S. PATENT DOCUMENTS

2008/0240692 A1* 10/2008 Eberle .................... E03C 1/12
392/449
2010/0024844 A1* 2/2010 Brunswick .......... A47L 15/4291
134/10

FOREIGN PATENT DOCUMENTS

| | | |
|---|---|---|
| EP | 1 111 118 A2 | 6/2001 |
| JP | 10-127383 | 5/1998 |
| JP | 2002-078661 | 3/2002 |
| JP | 2009-297356 | 12/2009 |
| KR | 10-2010-0023860 | 3/2010 |
| WO | WO-2008138308 A1 * 11/2008 | .............. A47L 15/42 |

OTHER PUBLICATIONS

International Search Report dated Jan. 12, 2012.

* cited by examiner

DISH WASHER HAVING A HEAT EXCHANGE PASSAGE

CROSS-REFERENCE TO RELATED APPLICATIONS

The present application claims priority under 35 U.S.C. 119 and 35 U.S.C. 365 to Korean Patent Application No. 10-2010-0051614 (filed on Jun. 1, 2010), Korean Patent Application No. 10-2010-0051610 (filed on Jun. 1, 2010), and Korean Patent Application No. 10-2010-0051621 (filed on Jun. 1, 2010), which are hereby incorporated by reference in its entirety.

BACKGROUND

The present disclosure relates to a dish washer.

In general, dish washers are apparatuses that wash dishes, using wash water sprayed from wash arms.

The dish washers comprise a tub defining a wash space, a sump disposed at one side of the tub and storing wash water, and a plurality of wash arms disposed inside the tub.

The wash water that is supplied to the sump is sprayed into the tub after flowing to the wash arms, and flows back to the sump after being sprayed into the tub.

The dish washers performs several operations until washing of dishes is completed and wash water is supplied from the outside through a water supply pipe in at least one operation of the operations.

SUMMARY

Embodiments provide a dish washer.

In one embodiment, there is provided a dish washer, the dish washer comprising: a tub that defines a space for washing dishes; a water supply unit that has a water chamber where water supplied from the outside collects, to wash the dishes; a sump that is supplied with water from the water chamber and supplies wash water into the tub; and a heat exchange passage through which the wash water in the sump flows and exchanges heat with the water in the water chamber while flowing.

In another embodiment, there is provided a dish washer, the dish washer comprising: a tub that defines a space for washing dishes; and a sump that is supplied with water from a water supply unit and supplies wash water into the tub, in which the water supply unit has a water supply part having a water chamber where water supplied from the outside collects, and a heat exchange part having heat exchange part having a heat exchange passage that is separated from the water chamber and supplied with wash water from the sump such that the wash water exchanges heat with the water in the water chamber.

DETAILED DESCRIPTION OF THE EMBODIMENTS

Reference will now be made in detail to the embodiments of the present disclosure, examples of which are illustrated in the accompanying drawings.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

In order for clear understanding, in this specification, "water" implies water that is not used in specific operations and "wash water" implies water that is supplied to a sump or a tub to be used in operations or that is used or has been used in the operations.

Further, the subject matter of any one embodiment may be applied to the subject matter of another embodiment, two or more embodiments may be combined, new structures may be derived from two or more embodiments, and it should be understood that those are comprised in the spirit of the present invention.

Figure 1:
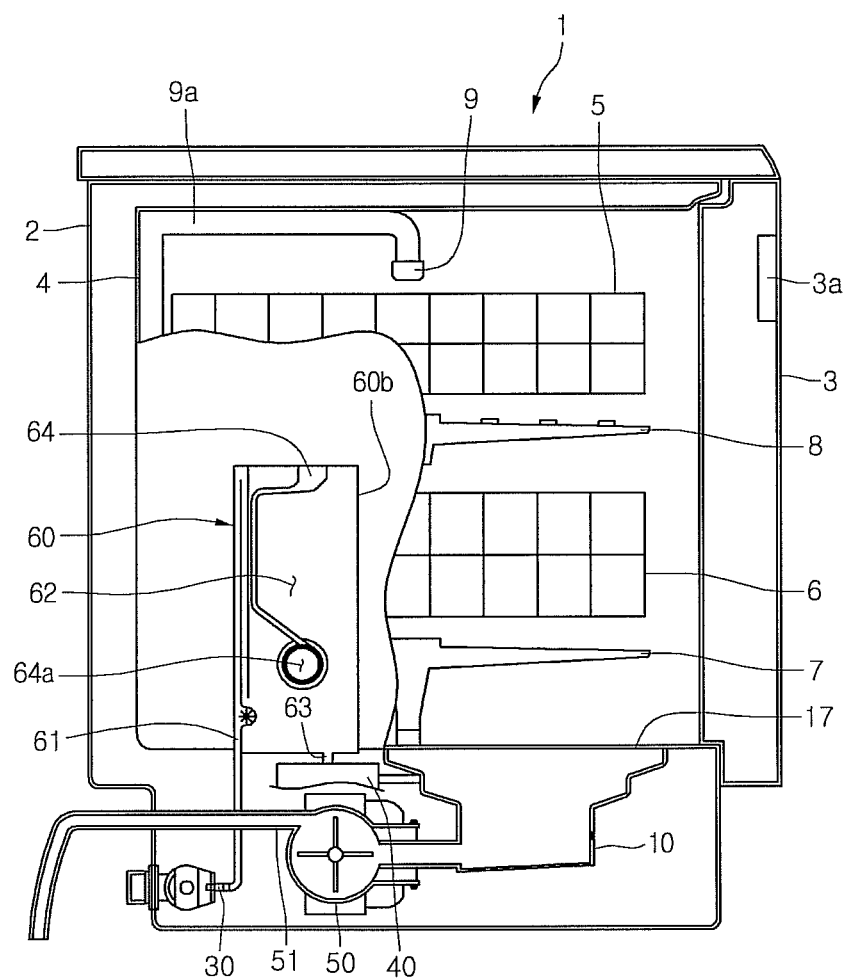
FIG. 1 is a schematic cross-sectional view of a dish washer according to a first embodiment.
Figure 2:
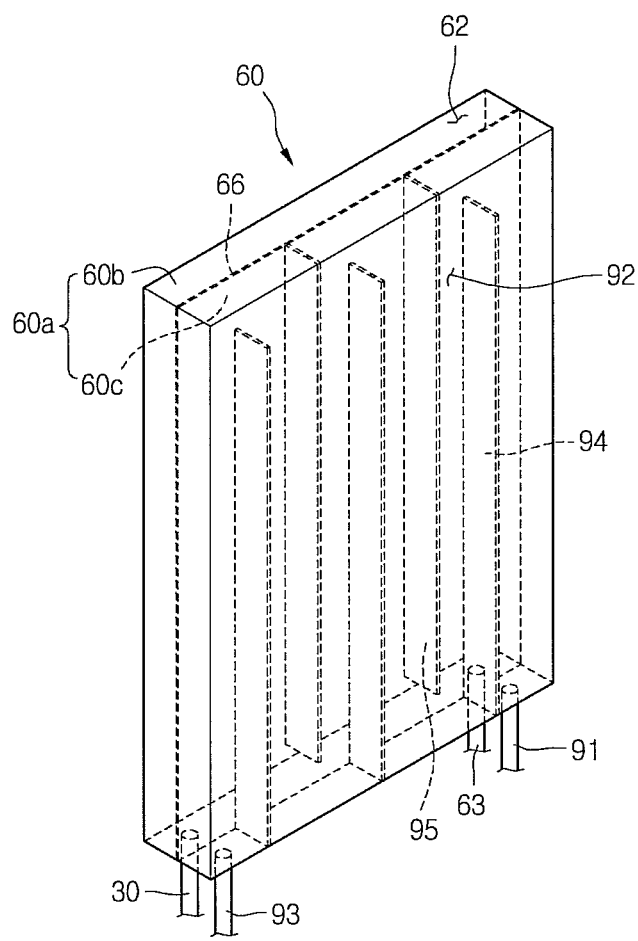
FIG. 2 is a perspective view of a water supply unit according to the first embodiment.
Figure 3:
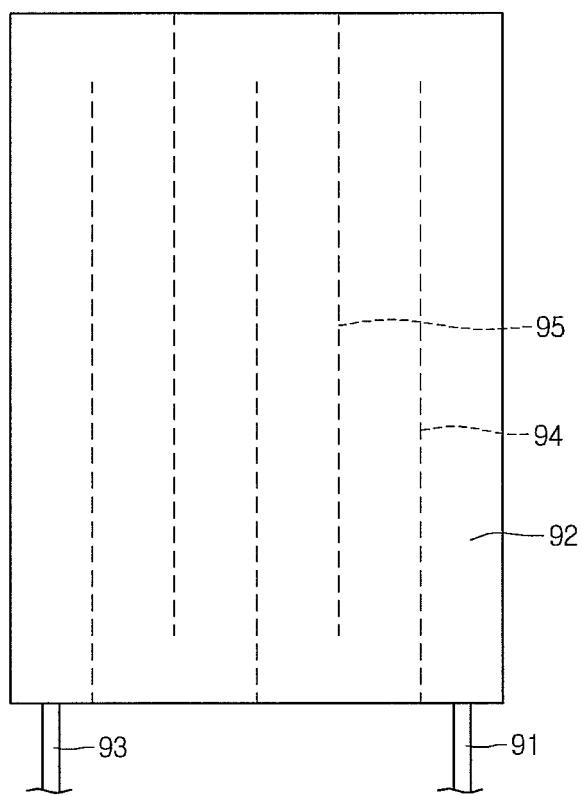
FIG. 3 is a front view of the water supply unit, showing the structure of a heat exchange passage.
Figure 4:
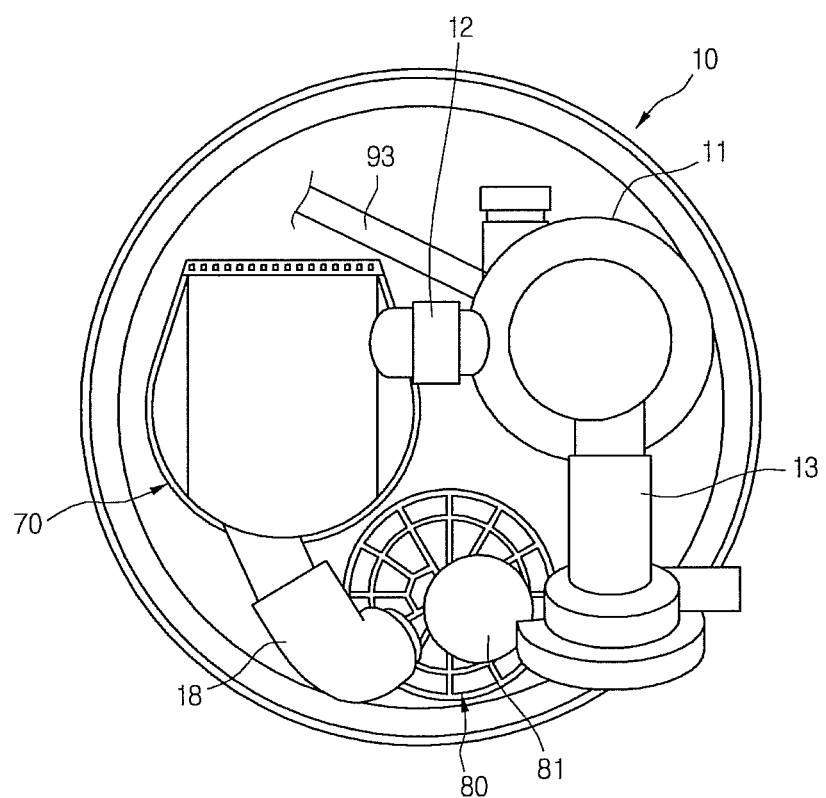
FIG. 4 is a bottom view of a sump according to the first embodiment.

FIG. 1 is a schematic cross-sectional view of a dish washer according to a first embodiment, FIG. 2 is a perspective view of a water supply unit according to the first embodiment, FIG. 3 is a front view of the water supply unit, showing the structure of a heat exchange passage, and FIG. 4 is a bottom view of a sump according to the first embodiment.

A portion (water supply part) of the configuration of a water supply unit is shown in FIG. 1 and the structure (heat exchange part) that is not shown in FIG. 1 is clearly shown in FIG. 2.

Referring to FIGS. 1 to 4, a dish washer 1 according to the embodiment comprises a case 2 that forms the external shape, a tub 4 that is disposed in the case 2 and defines a wash space where dishes are washed, a sump 10 that is disposed at a side of the tub 4 and collects wash water for washing dishes, and a door 3 that opens or closes the tub 4. The door 3 may be equipped with a control panel 3a that controls the operation of the dish washer 1. Further, the control panel 3a may be disposed at the case 2.

A plurality of racks where dishes are placed is disposed inside the tub 4. The racks may comprise a top rack 5 and a bottom rack 6 disposed under the top rack 5. Although it is exemplified when two racks 5 and 6 are disposed inside the tub 4 in the embodiment, it should be understood that the number of the racks is not limited in the embodiment.

Further, a plurality of wash arms, which is supplied with wash water from the sump 10 and sprays the wash water to the dishes on the racks 5 and 6, is disposed inside the tub 4.

The wash arms may comprise a bottom arm 7 connected to the sump 10, an intermediate arm 8 disposed above the bottom arm 7 and supplied with the wash water from the sump 10, and a top arm 9 disposed above the intermediate arm 8 and supplied with the wash water from the sump 10. It should be understood that the number of the wash arms is not limited and the number of the wash arms may depend on the number of the racks.

A wash water guide 9a that allows the wash water to be supplied to the intermediate arm 8 and the top arm 9 is connected to the sump 10. One wash water passage or two wash water passages, which are divided, may be formed in the wash water guide 9a. Alternatively, the wash water may be supplied to the intermediate arm 8 and the top arm 9 through a plurality of wash water guides, respectively.

The sump 10 may comprise a wash pump 70 that pumps up the wash water in the sump 10 and an adjuster 80 that adjusts the flow of the pumped wash water. Further, a drain pump 50 is connected to the sump 10. A drain passage 51 is connected to the drain pump 50. Therefore, the wash water that is discharged by the drain pump 50 is discharged out of the dish washer 1 through the drain passage 51.

The sump 10 comprises a first guide pipe 12 that guides the wash water to the wash pump 70 and a second guide pipe 13 that guides the wash water to the drain pump 50. A receiving portion 11 where a filter unit (described below) is received is formed in the sump 10. In the embodiment, since the wash water can be stored in the receiving portion 11, the receiving portion 11 can be called a wash water chamber. The first guide pipe 12 and the second guide pipe 13 extend from the receiving portion 11, apart from each other. The sump 10 further comprises a third guide pipe 18 that guides the wash water pumped up by the wash pump 70 to the adjuster 80.

An inlet 17 through which the wash water flows inside may be formed at the top of the sump 10. The wash water sprayed from one or more of the wash arms 7, 8, and 9 collects in the sump 10 through the inlet 17. Further, the wash water collecting in the sump 10 is supplied back to one or more of the wash arms 7, 8, and 9 by the wash pump 70.

The water supply unit 60 that guides the flow of the wash water is disposed between the tub 4 and the case 2. The water supply unit 60 can make the air outside the tub 4 and the air inside the tub 4 flow to each other.

The water supply unit 60 comprises a body 60a defining a space inside and a separator 66 dividing the space inside the body 60a into at least two spaces. The water supply unit 60 can be divided into the water supply part 60b and the heat exchange part 60c by the separator 66. That is, the water supply unit 60 comprises the water supply part 60b and the heat exchange part 60c.

The water supply part 60b comprises a first passage 61 communicating with a water supply pipe 30 connected with an external water supplier (not shown), a water chamber 62 where the water supplied through the first passage 61 collects, and a second passage 63 through which the water in the water chamber 62 is discharged. The second passage 63 is connected with a softener 40. The softener 40 removes hardness components contained in the water. Further, the softener 40 may be connected to the sump 10 or the tub 4. In the embodiment, since the water that is supplied from the outside to the sump 10 flows through the water supply pipe 30, the first and second passages 61 and 63, and the softener 40, they can be called a water supply passage. The softener may be removed, depending on the types of dish washers. In this case, the second passage 63 may be connected to the sump 10 or the tub 4. The water that is not supplied to the tub or the sump is stored in the water chamber 62.

Further, the water supply part 60b comprises a communicating passage 64 that communicates with the outside of the tub 4 or the outside of the dish washer 1 and a communicating hole 64a that communicates with the tub 4. The communicating passage 64 is separated from the first and second passages 61 and 63 and the water chamber 62.

Therefore, the inside of the tub 4 can be maintained at the atmospheric pressure by the water supply unit 60 and the pressure inside the tub 4 can be prevented from being increased by high-temperature air.

Meanwhile, the heat exchange part 60c can be supplied with the wash water from the sump 10. Therefore, heat can be exchanged between the wash water supplied to the heat exchange part 60c and the water collecting in the water chamber 62 of the water supply part 60b.

A supply passage 91 for being supplied with the wash water from the sump 10 and a discharge passage 93 for discharging the wash water that has exchanged heat with the water in the water chamber 62 to the sump 10 are connected to the heat exchange part 60c.

A heat exchange passage (or heat exchange channel) 92 for heat exchange between the water in the water chamber 62 and the wash water supplied from the sump is defined in the heat exchange part 60c. That is, in the embodiment, the heat exchange passage 92 and the water chamber 62 are separately formed in the water supply unit 60 and the heat exchange passage 92 is defined by a body 60a of the water supply unit 60.

The wash water in the supply passage 91 is in a state before heat exchange, the wash water in the heat exchange passage 92 is in a state where heat is being exchanged with the water in the water chamber 62, and the wash water in the discharge passage 93 is in a state where heat exchange is finished.

The wash water in a specific operation or before being discharged after a specific operation is finished can flow to the heat exchange part 60c. Water is supplied to the water chamber 62 from the external water supplier. The water can be supplied to the water chamber 62 in a specific operation or after a specific operation is finished.

In the embodiment, the temperature of the wash water of the sump 10 which flows to the heat exchange part 60c is higher than the temperature of the water stored in the water chamber 62. The wash water is heated by the heat of the dishes or a heater 19 disposed at the sump 10, such that temperature of the wash water is higher than the temperature of the water in the water chamber 62. Therefore, as the wash water flows to the heat exchange part 60*c*, the water in the water chamber 62 increases in temperature by exchanging heat with the wash water in the heat exchange part 60*c*.

The water in the water chamber 62 is used in the next operation, after a specific operation is finished. As the temperature of the water in the water chamber 62 increases, the operation efficiency (efficiency of washing or efficiency of rinsing) of the next operation can be improved.

In the embodiment, the heat exchange passage 92 may bend one or more times in order to improve the heat exchange efficiency between the water in the water chamber 62 and the wash water flowing through the heat exchange passage 92. In detail, the heat exchange part 60*c* is provided with a plurality of guides 94 and 95 to increase the flow distance of the wash water supplied from the sump 10. The guides 94 and 95 allow formation of zigzag heat exchange passage 92, for example, in the heat exchange part 60*c*. That is, one end of the first guide 94 is in contact with one side of the heat exchange part 60*c* and the other end is spaced apart from the other side (opposite to the one side) of the heat exchange part 60*c*. On the contrary, one end of the second guide 95 is spaced apart from one side of the heat exchange part 60*c* and the other end is in contact with the other side of the heat exchange part 60*c*.

In the embodiment, although one or more first and second guides 94 and 95 may be provided, more number of first and second guides may be provided, respectively, to increase the length of the heat exchange passage 92. Although it is shown in FIG. 3 that the first and second guides 94 and 95 extend up and down, the first and second guides 94 and 94 may extend left and right or at an angle.

Therefore, the heat of the wash water transfers to the water in the water chamber 62 through the separator 66 while the wash water supplied from the sump 10 flows through the heat exchange passage 92. Therefore, the separator 66 may be called as a heat exchange part, because it transfers heat in the embodiment.

In this configuration, the separator 66 is integrally formed with the body 60*a*, but may be implemented as an individual component. In this case, the separator 66 may be made of metal having high thermal conductivity, such as copper or aluminum.

A heat instructor may be disposed on the inner side and the outer side of the heat exchange part 60*c*, except for the separator 66.

Figure 5:
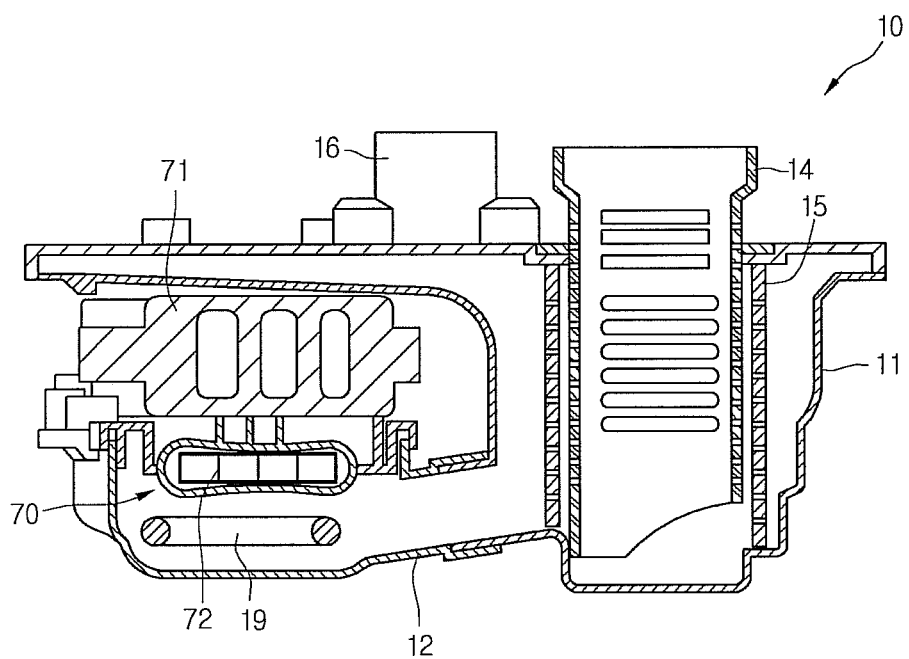
FIG. 5 is a cross-sectional view of the sump, showing the structure of a wash pump.
Figure 6:
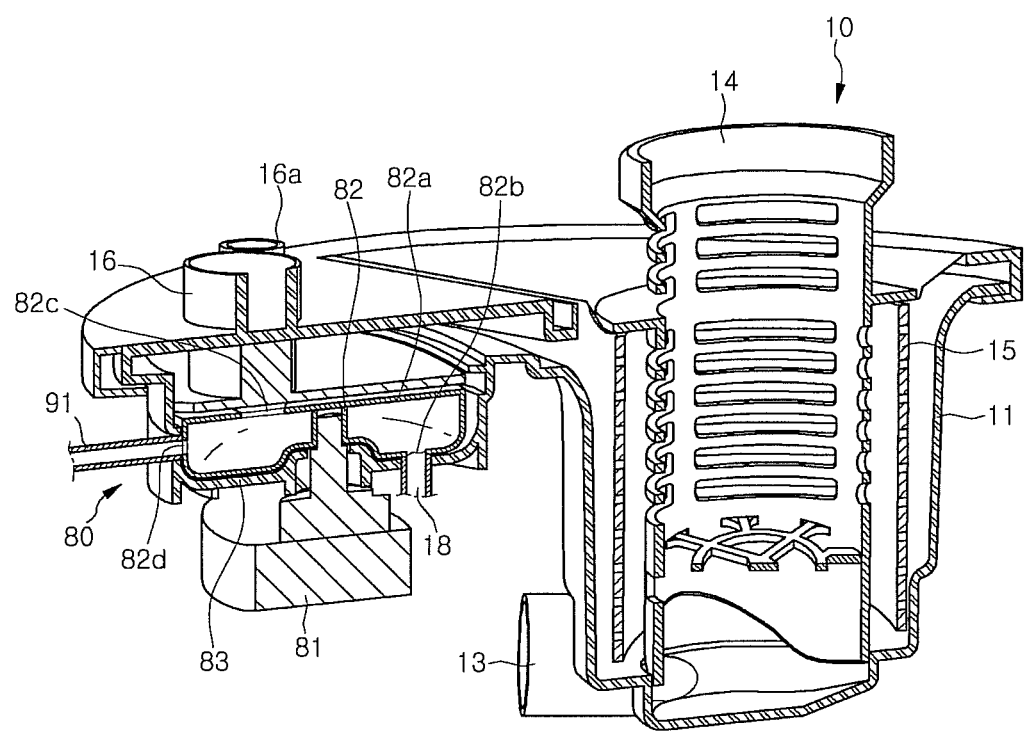
FIG. 6 is a cross-sectional view of the sump, showing the structure of an adjuster.

FIG. 5 is a cross-sectional view of the sump, showing the structure of a wash pump and FIG. 6 is a cross-sectional view of the sump, showing the structure of an adjuster.

Referring FIGS. 1 to 6, filter units 14 and 15 are accommodated in the receiving portion 11 of the sump 10. The filter units 14 and 15 comprise a first filter 14 that filters relatively large foreign substances and a second filter 15 that filters relatively small foreign substances. That is, the second filter 15 filters foreign substances that are not filtered through the first filter 14. Although it is exemplified in the embodiment that the filter units comprise two filters, the number of filters is not limited and one or more filters may be comprised.

As the wash pump 70 operates, the wash water sequentially passes through the first filter 14 and the second filter 15, and then flows to the wash pump 70 through the first guide pipe 12.

The wash pump 70 comprises a wash motor 71 and an impeller 72 connected to the wash motor 71. Further, the heater 19 that heats the wash water may be disposed under the impeller 72 in the sump 10. Therefore, the wash water heated by the heater 19 can flow to the adjuster 80 by rotation of the impeller 72.

The adjuster 80 comprises a control valve 82 and a valve motor 81 that rotates the control valve 82. A case 83 where the control valve 82 is accommodated is formed in the sump 10 and the valve motor 81 is connected to the control valve 82, at the outside of the sump 10, that is, the outside of the case 83.

The control valve 82 comprises a body 82*a* where a chamber in which the wash water flows is formed. The body 82*a* has one or more inlet holes 82*b* through which the wash water supplied from the third guide pipe 18 inside, one or more arm holes 82*c* for supplying the wash water to one or more arms of the wash arms, and one or more heat exchange holes 82*d* for supplying the wash water to the heat exchange part 60*c*. The supply passage 91 of the heat exchange part 60*c* is connected to the case 83. Further, the discharge passage 93 of the heat exchange part 60*c* is connected to the receiving portion 11 of the sump 10. In the embodiment, since supplying the wash water to one or more of the wash arms by using the control valve 82 can be implemented by well-known configuration, the detailed description is not provided.

As the control valve 82 turns to a predetermined position, the heat exchange hole 82*d* communicates with the supply passage 91, such that the wash water flows to the heat exchange part 60*c*. Therefore, whether the wash water flows to the heat exchange passage may be determined by the turning position of the control valve 82. When the supply passage 91 communicates with the heat exchange hole 82*d*, the arm hole 82*c* may communicate with one or more of the wash arms, or may not communicate with all of the wash arms.

A first connecting portion 16 where the bottom arm 6 is connected and a second connecting portion 16*a* where the wash water guide 9*a* is connected are formed at the top of the sump 10.

Meanwhile, the dish washer 1 performs a plurality of operations until completing washing the dishes. In general, the operations may comprise at least washing that washes the dishes and rinsing that rinses out the dishes. Drying may be added after the rinsing is completed, depending on the types of dish washers.

The washing is a single or may comprise a plurality of sub-operations. For example, the washing may comprise pre-washing and main washing. The heater 19 may not operate in the pre-washing, while the heater 19 may operate in the main washing. When the washing is a single operation, the heater 19 may operate at least in some period of the operation.

The rinsing is a single or may comprise a plurality of sub-operations. For example, the rinsing may comprise common rinsing and heat-rinsing. The heater 19 may not operate in the common rinsing, while the heater 19 may operate in the heat-rinsing. When the rinsing is a single operation, the heater 19 may operate at least in some period of the operation.

Meanwhile, water may be supplied from the outside to the dish washer, before at least one operation of the entire operation for washing the dishes starts. In this state, water that is used in the next operation is stored in the water chamber 62.

Since the heater 19 operates when the main washing is performed, the temperature of the washing water is higher than the temperature of the water in the water chamber 62. Therefore, in order to improve the operation efficiency of the common rinsing, heat may be exchanged between high-temperature wash water and the water in the water chamber 62, before the common rinsing starts. Heat may be exchanged between high-temperature wash water and the water in the water chamber 62 to improve the operation efficiency in the following rinsing, even if the washing is a single operation.

When the water is stored in the water chamber 62, the heat inside the tub can transfer to the water in the water chamber 62. Therefore, the water in the water chamber 62 can be increased in temperature by the heat inside the tub. The water supply part 60b may be in contact with the tub 4 or a heat conductor may be disposed between the water supply part 60b and the tub 4 so that the heat of the tub 4 transfers to the water in the water chamber 62.

Alternatively, although the heater 19 does not operate in the common rinsing, the temperature of the wash water is higher than the temperature of the water in the water chamber 62, due to latent heat inside the tub. Therefore, in order to improve the operation efficiency of the heat-rinsing, heat may be exchanged between high-temperature wash water and the water in the water chamber, before the rinsing starts.

Hereafter, the "specific operation" implies a operation in which the temperature of the wash water when the present operation is performed is higher than the temperature of the water that is supplied to the next operation and the specific operation may be one or more until washing the dishes is completed.

A control method of the dish washer according to the embodiment is described hereafter.

Figure 7:
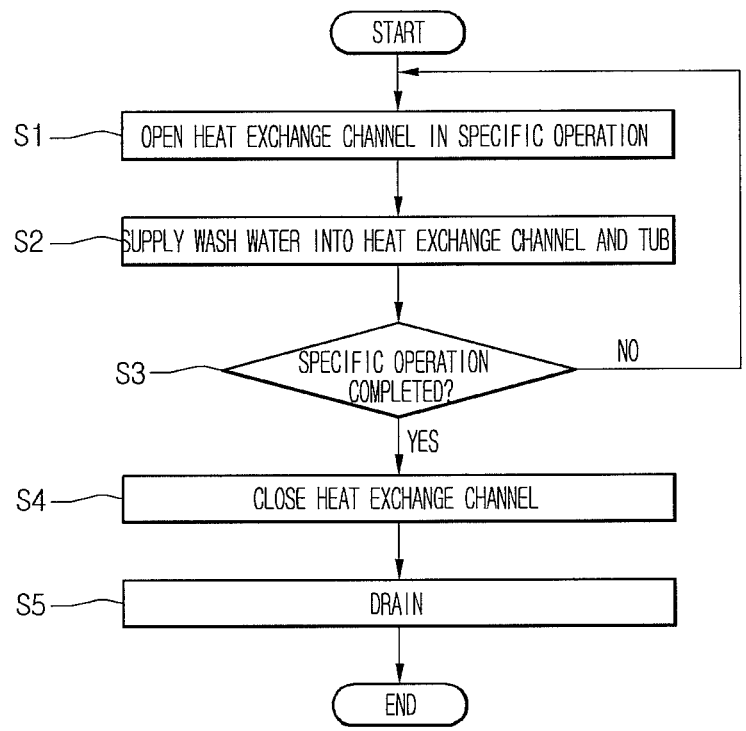
FIG. 7 is a flowchart illustrating a control method of the dish washer according to the first embodiment.

FIG. 7 is a flowchart illustrating a control method of the dish washer according to the first embodiment.

The embodiment exemplifies that the wash water flows to the heat exchange passage in a specific operation.

Referring to FIG. 7, the heat exchange passage 92 is opened by the operation of the adjuster 80 in the specific operation (S1). In the embodiment, the fact that the heat exchange passage 92 is opened implies that a state in which the wash water can flow to the heat exchange passage 92 is implemented.

When water that is used in the next operation is supplied to the water chamber 62 in the early state of the specific operation, the heat exchange passage 92 may be opened in the early state of the specific operation. When water that is used in the next operation is supplied to the water chamber 62 in the middle of the specific operation, the heat exchange passage 92 may be opened when water starts to be supplied to the water chamber 62. Since the heat exchange passage 92 is opened in the specific operation in the embodiment, the wash water can be supplied to at least one arm of the wash arms.

Since the wash pump 70 operates in the specific operation, when the heat exchange passage 92 is opened, the wash water is supplied to the heat exchange passage 92 and the wash water is supplied to the tub 4 by at least one wash arm (S2). The wash water supplied to the heat exchange passage 92 is returned to the sump 10, after exchanging heat with the water in the water chamber 62.

It is determined in the specific operation whether the operation is completed (S3), and when it is determined that the specific operation is completed, the heat exchange passage 92 is closed by the operation of the adjuster 80 (S4). That is, the supply passage 91 and the control valve 82 are blocked.

Further, the operation of the wash pump 70 is stopped. In the embodiment, the fact that the heat exchange passage 92 is closed implies that a state in which the wash water does not flow to the heat exchange passage 92 is implemented.

When the heat exchange passage 92 is closed, the drain pump 50 operates and draining starts (S5). The heat exchange passage 92 communicates with the sump 10 by the discharge passage 93, the wash water in the heat exchange passage 92 can be discharge outside the dish washer when the drain pump 50 operates. The water in the water chamber 62 is supplied to the sump 10 or the tub 4, after draining is completed.

According to the embodiment, the water that is used in the next operation exchanges heat with the wash water of which the temperature is higher than the temperature of the water and the heat-exchanged water is supplied to the sump 10, such that the operation efficiency of the next operation, for example, the washing or rinsing efficiency is improved.

Further, since the heat exchange passage 92 in the water chamber 62 bends one or more times, heat exchange efficiency between the water in the water chamber 62 and the wash water in the heat exchange passage 92 is improved.

Figure 8:
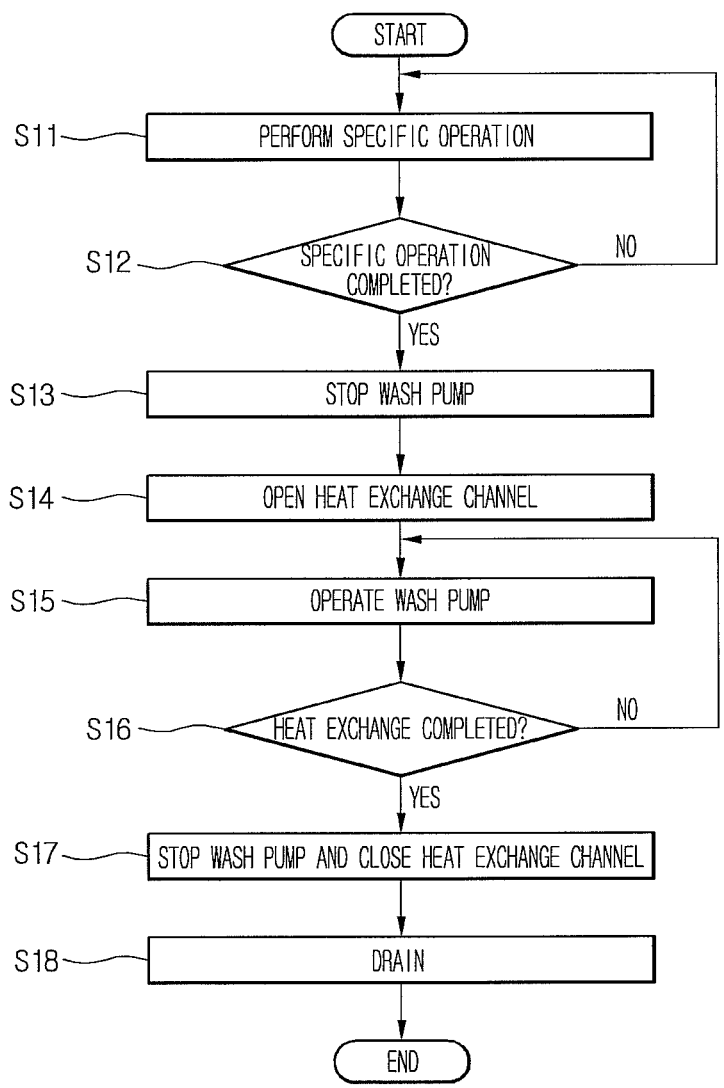
FIG. 8 is a view illustrating a control method of a dish washer according to a second embodiment.

FIG. 8 is a view illustrating a control method of a dishwater according to a second embodiment.

The embodiment is the same in other configurations as the first embodiment, but is different in the timing of opening the heat exchange passage.

Referring to FIG. 8, a specific operation starts, the wash pump 70 operates and washing the dishes starts (S11). Further, it is determined whether the operation is completed in the specific operation (S12). When it is determined that the specific operation is completed, the wash pump 70 stops (S13). Next, the heat exchange passage 92 is opened by the operation of the adjuster 80 (S14). Further, the wash pump 70 operates (S15). Alternatively, the heat exchange passage 92 may be opened by the operation of the adjuster 80 while the wash pump 70 keep operating after the specific operation is completed. Obviously, the wash water is not supplied to the wash arms, after the specific operation is completed.

As the heat exchange passage 92 is opened, the wash water exchanges heat with the water in the water chamber 62 while flowing through the heat exchange passage 92. Whether the heat exchange is completed is determined in this process (S16). Whether heat exchange is completed may be determined, for example, by the operation time of the wash pump 70, the number of revolutions of the wash motor, the flow rate of the wash water flowing to the heat exchange passage (a flow sensor may be additionally provided in this case), or the temperature of the water which is sensed by a temperature sensor disposed in the water chamber 62, after the specific operation is completed. The method of determining whether heat exchange is completed is not limited in the embodiment.

When it is determined that heat exchange is completed, the operation of the wash pump 70 stops and the heat exchange passage 92 is closed (S17). Thereafter, the drain pump 50 operates and draining is performed (S18).

Figure 9:
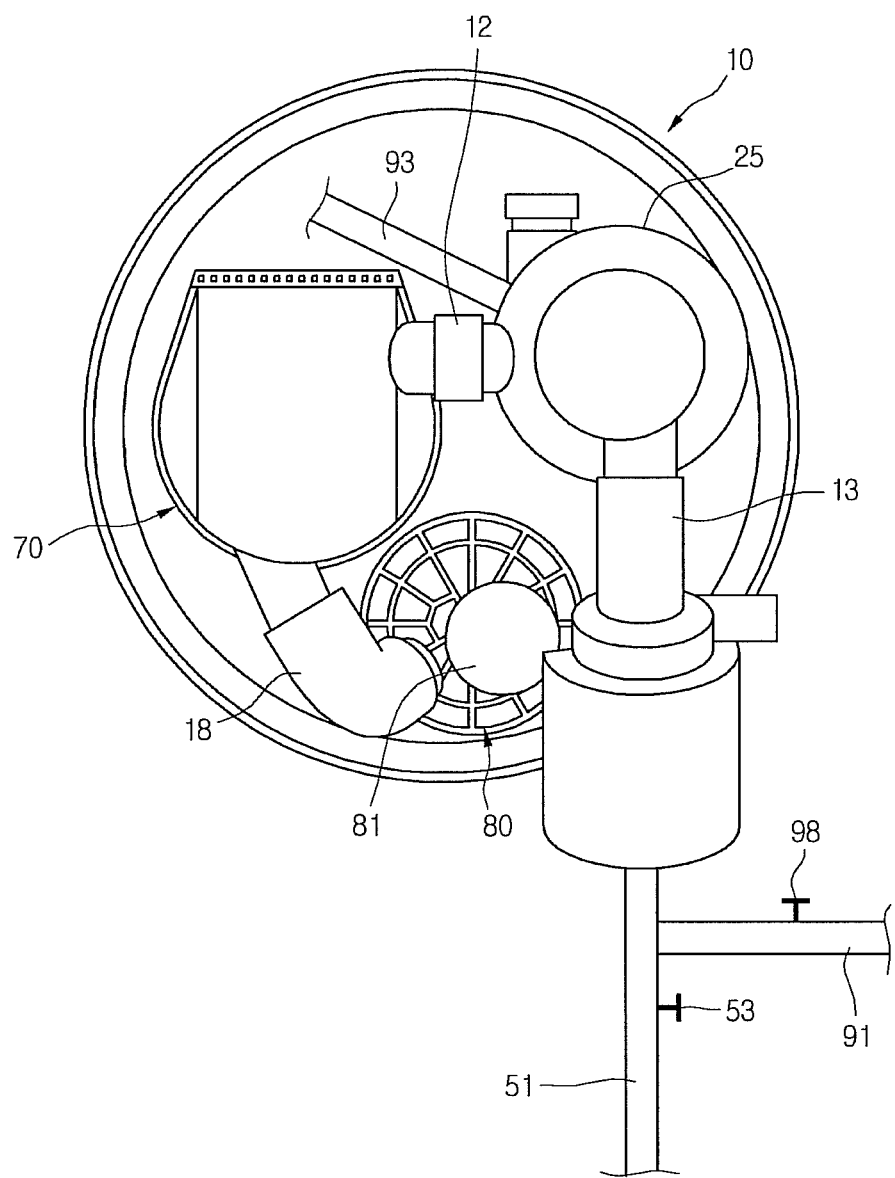
FIG. 9 is a bottom view of a sump according to a third embodiment.
Figure 10:
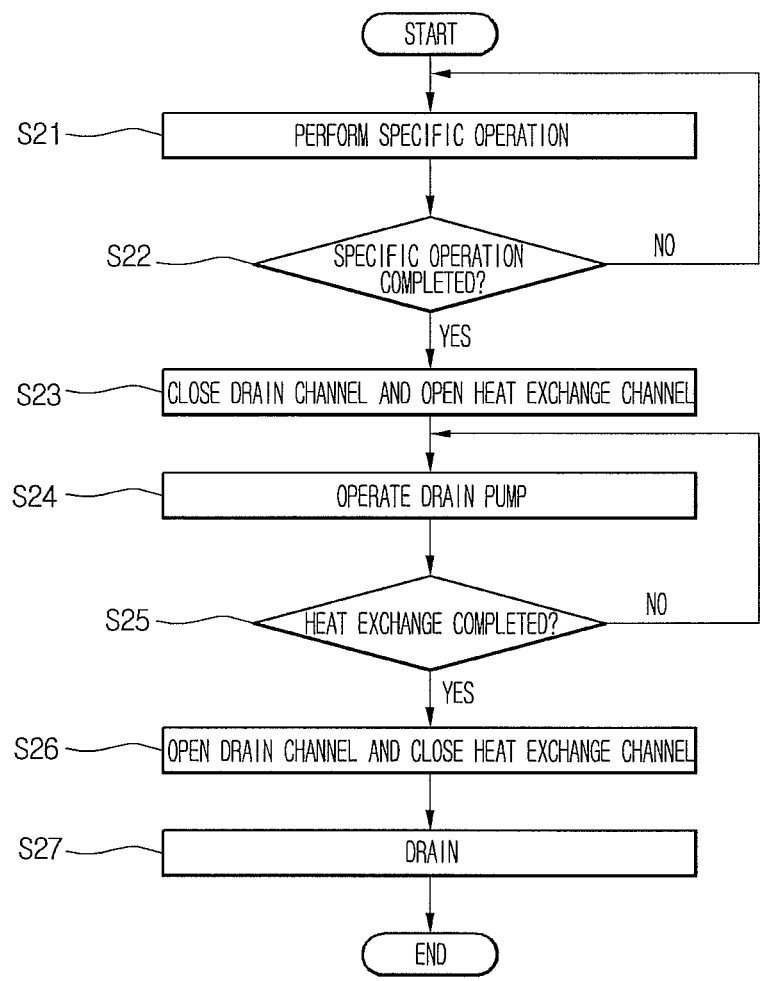
FIG. 10 is a flowchart illustrating a control method of a dish washer according to the third embodiment.

FIG. 9 is a bottom view of a sump according to a third embodiment and FIG. 10 is a flowchart illustrating a control method of the dish washer according to the third embodiment.

First, referring to FIG. 9, the supply passage 91 of the embodiment is connected to the drain passage 51 connected to the outlet side of the drain pump 50 while the discharge passage 93 is connected to the receiving portion 11 of the sump 10. The flow direction of the wash water flowing through the supply passage 91 and the flow direction of the wash water flowing through the first guide pipe 12 are substantially different.

A first valve 53 is disposed in the drain passage 51 to open/close the passage and a second valve 98 is disposed in the supply passage 91 (or heat exchange passage) to open/close the passage.

A control method of the dish washer according to the embodiment is described hereafter.

Referring to FIG. 10, a specific operation starts, the wash pump 70 operates and washing the dishes starts (S21). Further, it is determined whether the operation is completed in the specific operation (S22). When it is determined that the specific operation is completed, the wash pump 70 stops. Further, the drain passage 51 is closed by the first valve 53 and the heat exchange passage (or supply passage) is opened by the second valve 98 (S23). Since the drain pump 50 does not operate before draining is performed, the heat exchange passage 92 and the drain passage 51 can be open. However, the drain passage 51 should be closed and the heat exchange passage 92 should be open, before the specific operation is completed and draining is performed. Obviously, since the wash pump 70 operates in the specific operation, the wash water does not flow to the heat exchange passage 92 even if the heat exchange passage is open.

The drain pump 50 operates after the drain passage 51 is closed and the heat exchange passage 92 is opened (S24). Accordingly, the wash water in the sump 10 flows to the heat exchange passage 92 through the drain pump 50. Accordingly, the wash water exchanges heat with the water in the water chamber 62 while flowing through the heat exchange passage 92. The wash water that has exchanged heat with the water flows into the sump 10.

Whether the heat exchange is completed is determined in this process (S25). When it is determined that the heat exchange is completed, the heat exchange passage 92 is closed and the drain passage 51 is opened (S26). In this operation, the drain pump 50 keeps operating. As the drain passage 51 is opened, draining is performed (S27).

Figure 11:
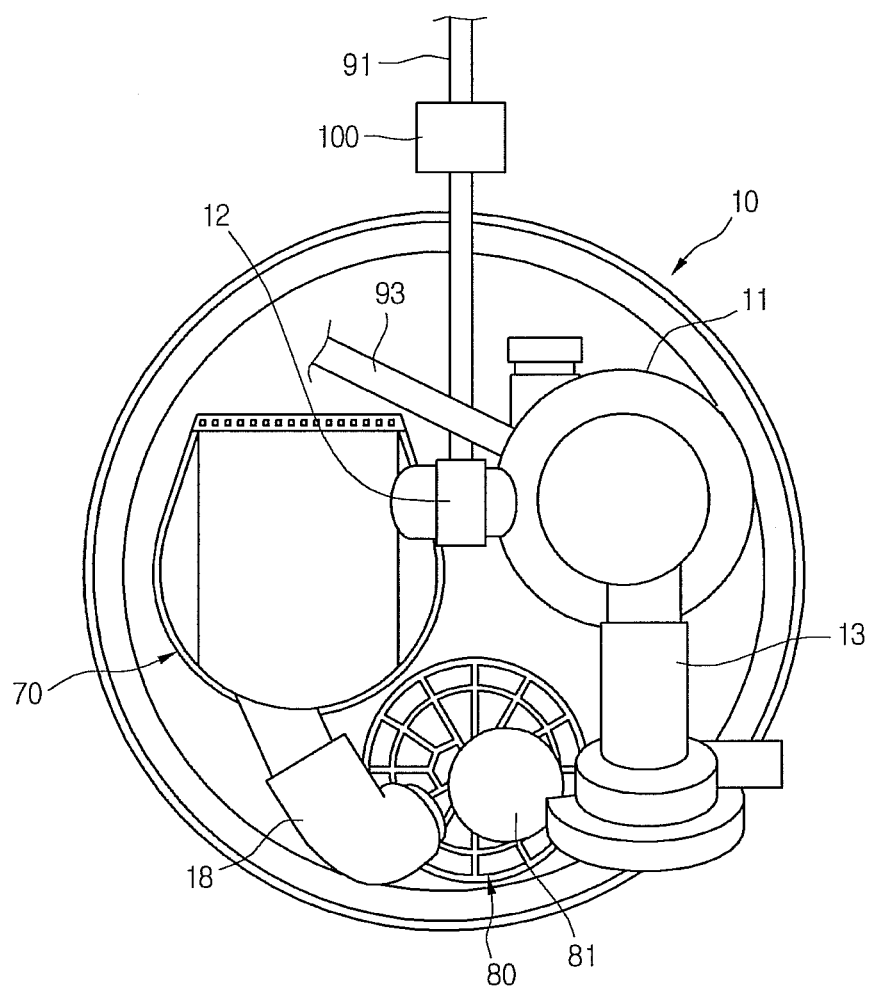
FIG. 11 is a bottom view of a sump according to a fourth embodiment.
Figure 12:
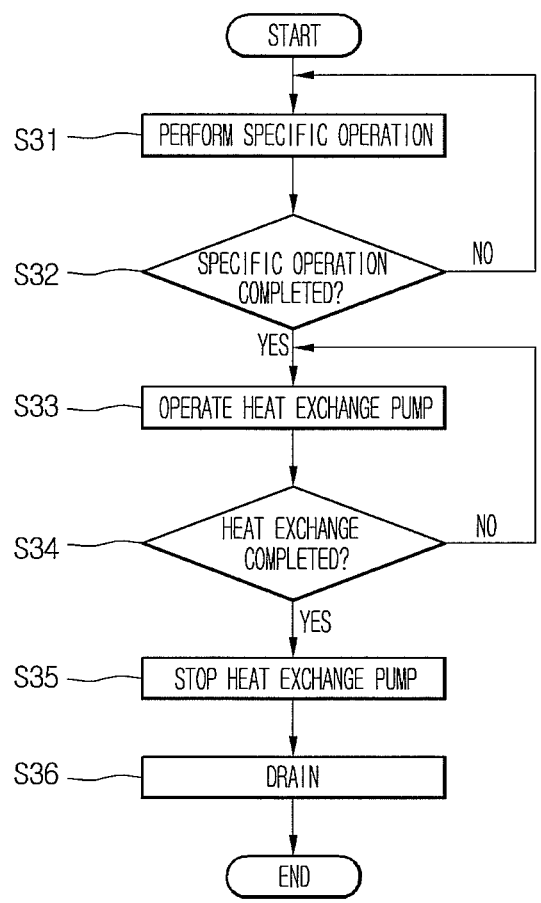
FIG. 12 is a flowchart illustrating a control method of a dish washer according to the fourth embodiment.

FIG. 11 is a bottom view of a sump according to a fourth embodiment and FIG. 12 is a flowchart illustrating a control method of the dish washer according to the fourth embodiment.

First, referring to FIG. 11, the supply passage 91 of the embodiment is connected to the first guide passage 12 that guides the wash water to the wash pump 70 while the discharge passage 93 is connected to the receiving portion 11 of the sump 10.

A heat exchange pump 100 that allows the wash water to flow to the supply passage 91 is disposed in the supply passage 91.

A control method of the dish washer according to the embodiment is described hereafter.

Referring to FIG. 12, a specific operation starts, the wash pump 70 operates and washing the dishes starts (S31). Further, it is determined whether the operation is completed in the specific operation (S32). When it is determined that the specific operation is completed, the wash pump 70 stops. Next, the heat exchange pump 100 operates (S33). Accordingly, the wash water in the sump 10 flows to the heat exchange passage 92 by the operation of the heat exchange pump 100. Accordingly, the wash water exchanges heat with the water in the water chamber 62 while flowing through the heat exchange passage 92. The wash water that has exchanged heat with the water flows into the sump 10.

Whether the heat exchange is completed is determined in this process (S34). When it is determined that the heat exchange is completed, the heat exchange pump 100 stops (S35). Thereafter, the drain pump 50 operates and draining is performed (S36).

Figure 13:
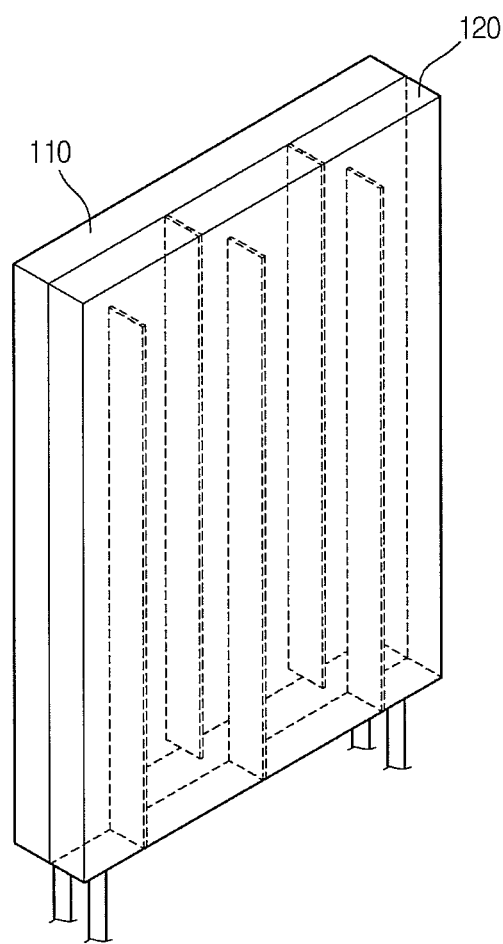
FIG. 13 is a perspective view of a water supply unit according to a fifth embodiment.

FIG. 13 is a perspective view of a water supply unit according to a fifth embodiment.

Referring to FIG. 13, a heat exchange unit 120 is in contact with a surface of a water supply unit 110 of the embodiment. That is, the water supply unit 110 and the heat exchange part 120 are separately formed, in contact to exchange heat with each other.

The structure of the water supply unit 110 is the same as the structure of the water supply part 60*b* of the first embodiment and the structure of the heat exchange part 120 is the same as the structure of the heat exchange part 60*c* of the first embodiment, such that the detailed description is not provided.

The heat exchange unit 120 may be made of metal having high thermal conductivity, such as copper or aluminum. Alternatively, the surface that is in contact with the water supply unit 110, in the heat exchange unit 120, may be made of metal. It should be understood that the material of the heat exchange unit 120 is not limited in the embodiment.

Figure 14:
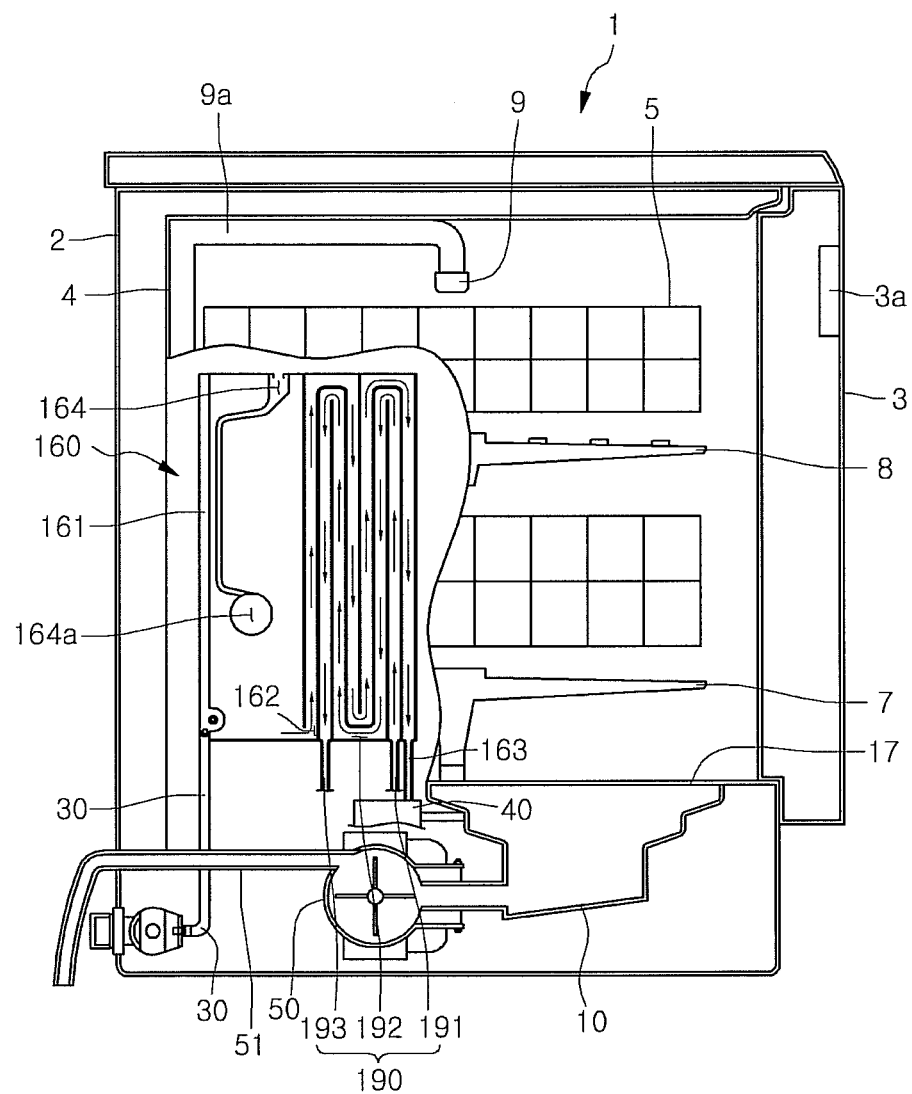
FIG. 14 is a cross-sectional view of a dish washer equipped with the water supply unit according to the fifth embodiment of the present invention.

FIG. 14 is a cross-sectional view of a dish washer equipped with the water supply unit according to the fifth embodiment of the present invention.

The embodiment shown in FIG. 14 is the same in other configurations as the first embodiment, but is different in the structure of the water supply unit. Therefore, only the features of the embodiment are described herein.

Referring to FIG. 14, the water supply unit 160 of the dish washer of the embodiment comprises a first passage 161 communicating with a water supply pipe 30 connected with an external water supplier (not shown), a water chamber 162 where the water supplied through the first passage 161 flows, and a second passage 163 through which the water in the water chamber 162 is discharged.

Further, the water supply unit 160 comprises a communicating passage 164 that communicates with the outside of the tub 4 or the outside of the dish washer 1 and a communicating hole 164*a* that communicates with the tub 4. The communicating passage 164 is separated from the first and second passages 161 and 163 and the water chamber 162.

The dish washer of the embodiment further comprises a heat exchange passage 190 for collecting some of the wash water in the sump 10, which has exchanged heat with the water flowing in the water chamber 62 of the water supply unit 60, into the sump 10. A portion of the heat exchange passage 190 is positioned in the water chamber 162.

In detail, the heat exchange passage 190 comprises a first heat exchange passage 191 connected with the sump 10, at the outside of the water supply unit 160, a second heat exchange passage 192 disposed in the water supply unit 60, and a third heat exchange passage 93 guiding the wash water, which exchanges heat while flowing through the second heat exchange passage 92, at the outside of the water supply unit 60.

That is, the second heat exchange passage 192 is defined by the water supply unit 160. Further, a portion of the water chamber 162 and the second heat exchange passage 192 bend one or more times and separated from each other, in the water supply unit 160. For example, the water chamber 162 and the second heat exchange passage 192, which bend several times, are shown in FIG. 14.

Further, the flow direction of the water flowing in the water chamber 162 and the flow direction of the wash water flowing through the second heat exchange passage 162 are not the same in some section or the entire section of the second heat exchange passage 192, in the water supply unit 160. For example, in FIG. 14, the flow direction of the water and the flow direction of the wash water are opposite to each other. That is, the water in the water chamber 162 and the wash water in the second heat exchange passage 192 are counterflow. Further, the water chamber 162 and the second heat exchange passage extend in parallel in the water supply unit 160. Therefore, heat exchange efficiency between the water in the water chamber 162 and the wash water in the second heat exchange passage 192 can be improved.

The state of the wash water flowing through the heat exchange passage 190 is described. The wash water in the first heat exchange passage 191 is in a state before heat exchange, the wash water in the second heat exchange passage 192 is in a state where heat is being exchanged with the water in the water chamber 162, and the wash water in the third heat exchange passage 193 is a state after heat exchange is completed. Since heat exchange is performed substantially in the second heat exchange passage 192 in the embodiment, the first heat exchange passage 191 can be called a supply passage and the third heat exchange passage 193 can be called a discharge passage.

Figure 15:
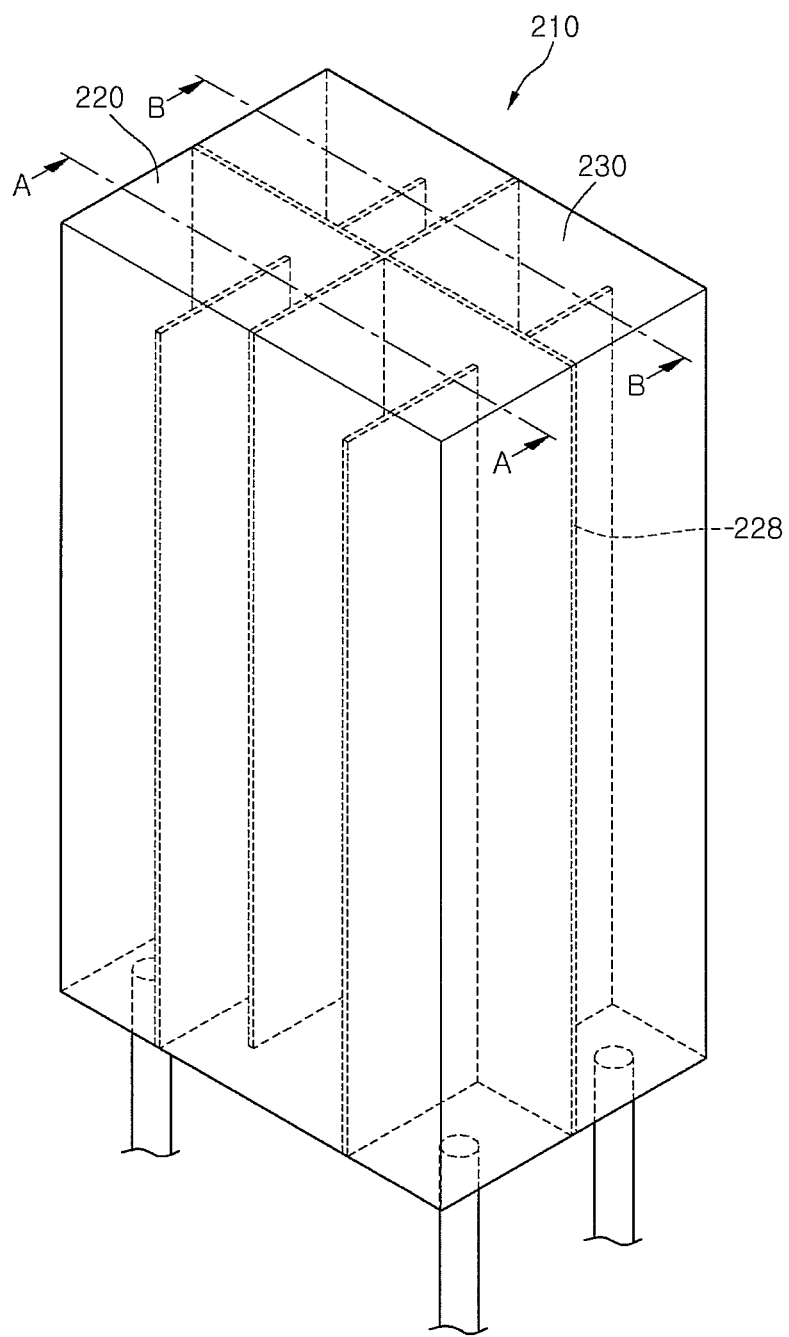
FIG. 15 is a perspective view of a water supply unit according to a sixth embodiment.
Figure 16:
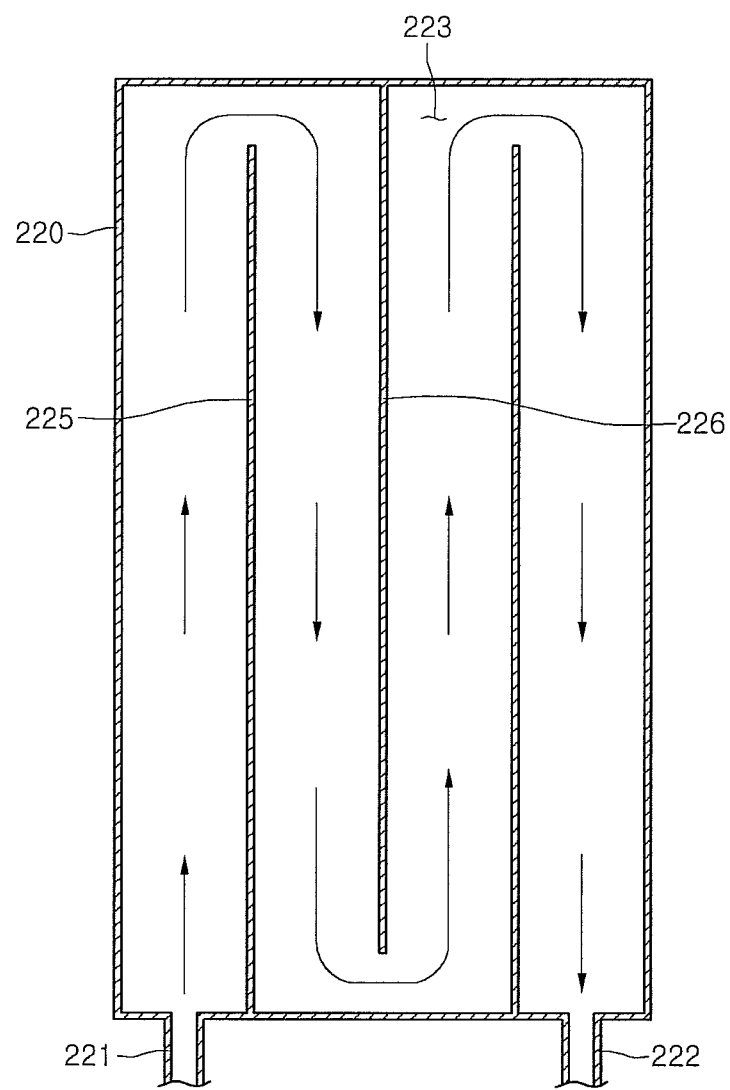
FIG. 16 is a cross-sectional view taken along the line A-A of FIG. 15.
Figure 17:
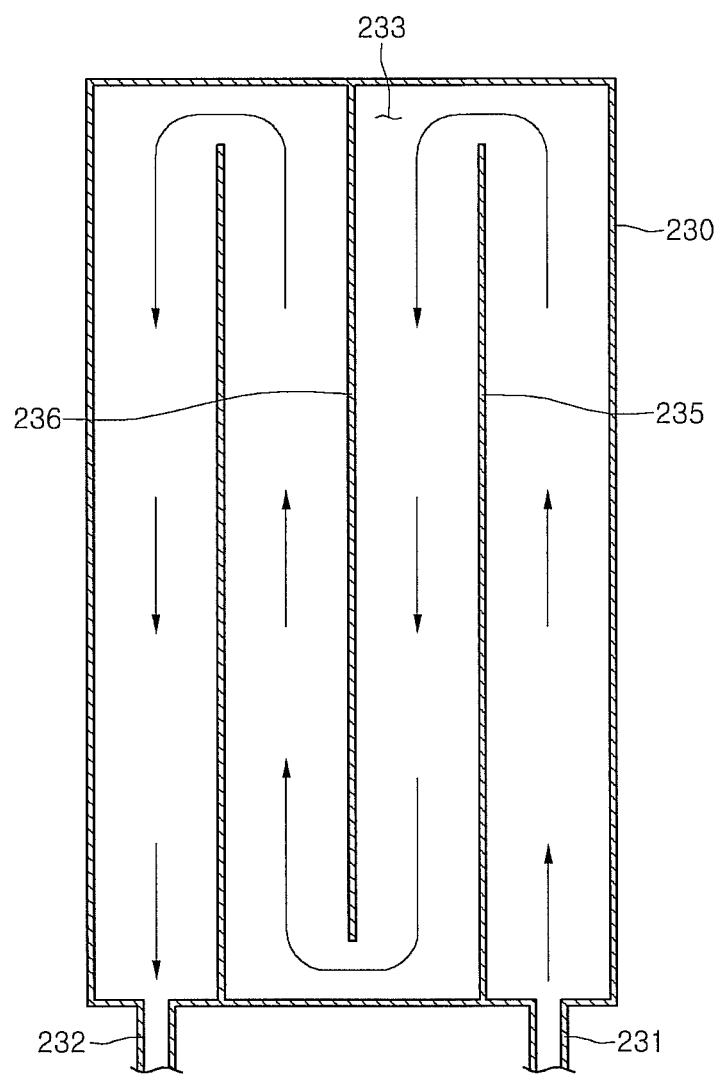
FIG. 17 is a cross-sectional view taken along the line B-B of FIG. 15.

FIG. 15 is a perspective view of a water supply unit according to a sixth embodiment, FIG. 16 is a cross-sectional view taken along the line A-A of FIG. 15, and FIG. 17 is a cross-sectional view taken along the line B-B of FIG. 15.

Referring to FIGS. 15 to 17, the inside of a water supply unit 210 according to the embodiment is divided into two spaces by a separator 228. Therefore, the water supply unit 210 can be divided into a water supply part 220 where water flows and a heat exchange part 230 where wash water supplied from the sump flows, by the separator 228.

The water supply part 220 and the heat exchange part 230 have a plurality of guides 225, 226, 235, and 236 for forming bending passages, respectively. A bending water chamber 223 is formed in the water supply part 220 by the guides 225 and 226. A bending second heat exchange passage 233 is formed in the heat exchange part 230 by the guides 235 and 236.

A water supply pipe 221 connected with an external water supplier (not shown) and a discharge pipe 222 through which the water in the water chamber 223 is discharged are connected to the water supply part 220.

A first heat exchange passage 231 (or supply passage) that allows the wash water in the sump to flow to the heat exchange part 230 and a third heat exchange passage 232 (discharge passage) that allows the wash water in the heat exchange part 230 to flow to the sump are connected to the heat exchange part 230.

Further, the flow direction of the water in the water supply part 220 is opposite to the flow direction of the wash water in the heat exchange part 230. Further, the heat of the wash water transfers to the water through the separator 228.

Although it is exemplified in the embodiment that the water supply unit is divided into the water chamber and the second heat exchange passage by the separator, a separate water supply unit and a separate heat exchange part may be in contact with each other to exchange heat.

Figure 18:
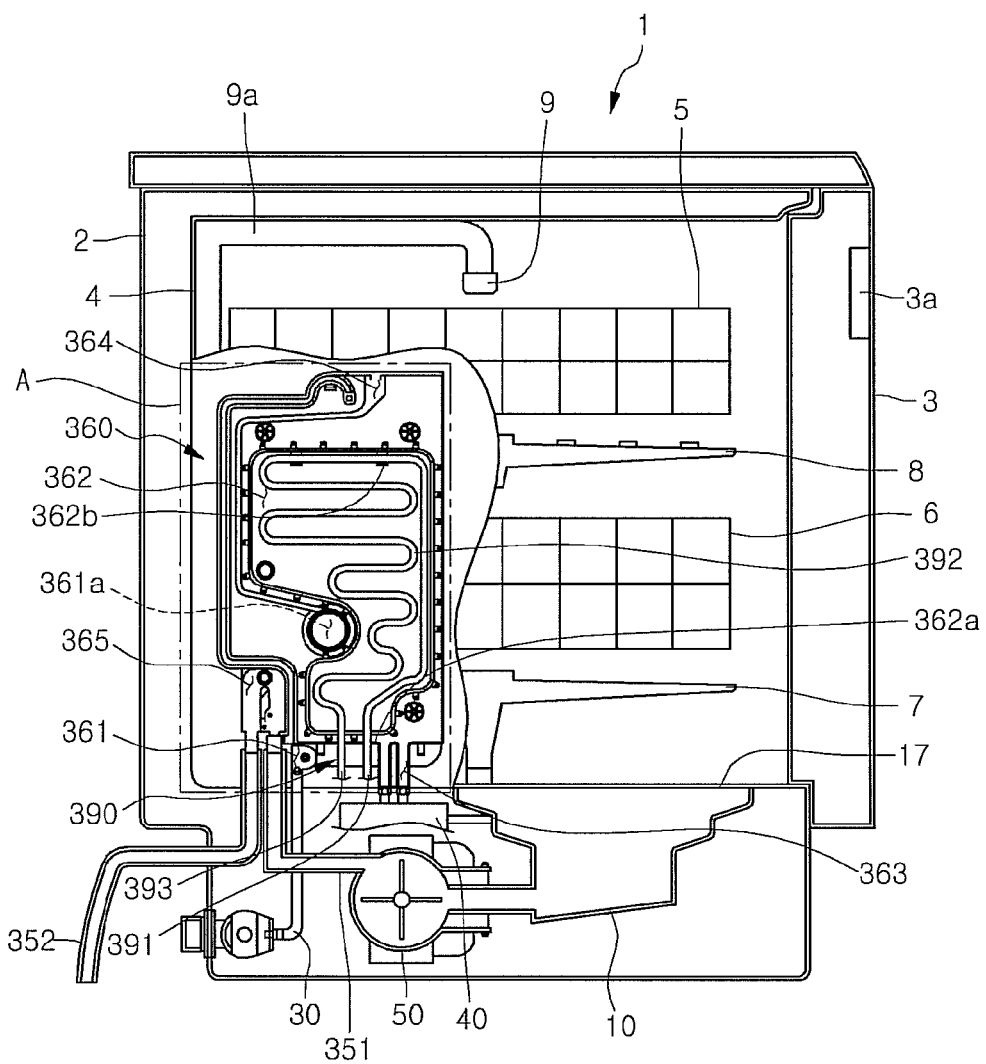
FIG. 18 is a cross-sectional view of a dish washer equipped with a water supply unit according to a seventh embodiment.
Figure 19:
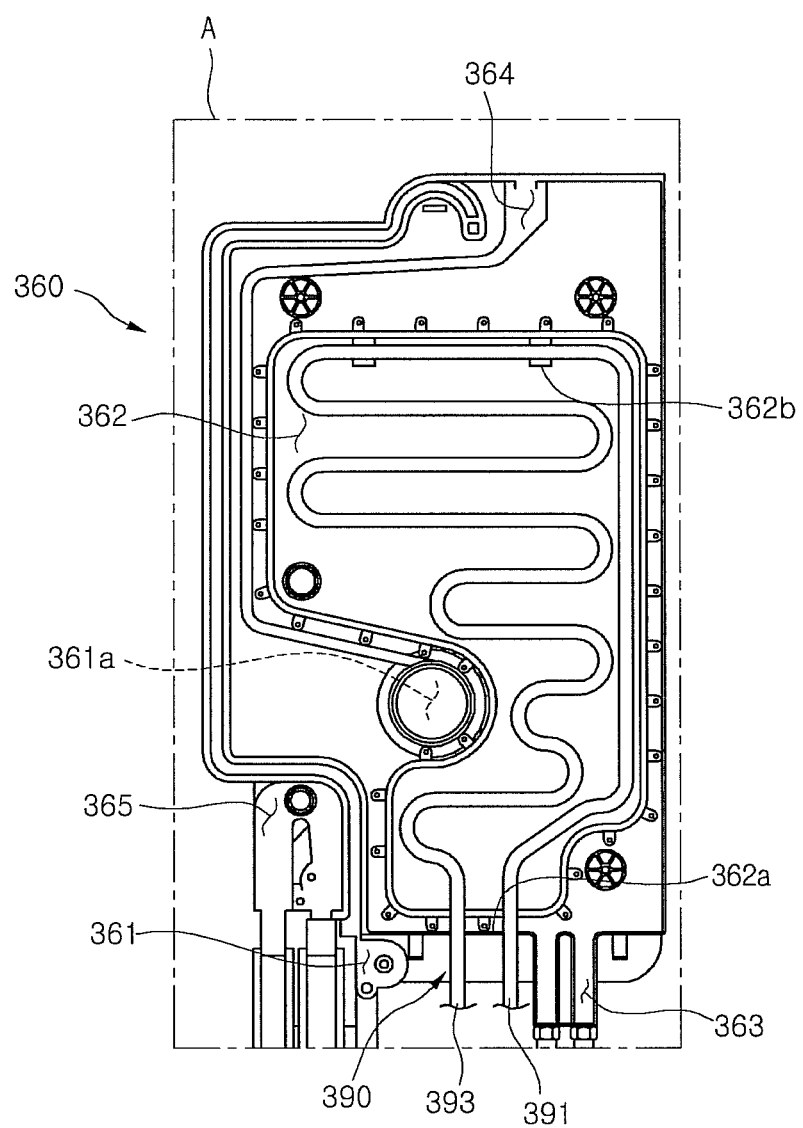
FIG. 19 is an enlarged view of the portion A of FIG. 18.

FIG. 18 is a cross-sectional view of a dish washer equipped with a water supply unit according to a seventh embodiment and FIG. 19 is an enlarged view of the portion A of FIG. 18.

Referring to FIGS. 18 and 19, the water supply unit 360 of the embodiment comprises a first passage 361 communicating with a water supply pipe 30 connected with an external water supplier (not shown), a water chamber 361 where the water supplied through the first passage 361 collects and a second passage 363 through which the water in the water chamber 362 is discharged.

Further, the water supply unit 360 comprises a communicating passage 364 that communicates with the outside of the tub 4 or the outside of the dish washer 1 and a communicating hole 364a that communicates with the tub 4. The communicating passage 364 is separated from the first and second passages 361 and 363 and the water chamber 362.

Further, the water supply unit 360 comprises a guide passage 365 through which the wash water discharged from the sump 10 flows. One end of the guide passage 365 communicates with the drain pump 50 by a first drain passage 351. A second drain passage 352 is connected to the other end of the guide passage 365. Therefore, the wash water that is discharged by the drain pump 50 is discharged out of the dish washer 1 through the first drain passage 351, the guide passage 365, and the second drain passage 352.

Meanwhile, the dish washer 1 further comprises a heat exchange pipe 390 for collecting some of the wash water in the sump 10, which has exchanged heat with the water in the water chamber 362 of the water supply unit 360, into the sump 10. The heat exchange pipe 390 defines a heat exchange passage and a portion of the heat exchange pipe 390 is positioned inside the water chamber 362.

The heat exchange pipe 390 comprises a first heat exchange pipe 391 (or supply pipe) connected with the sump 10, at the outside of the water supply unit 360, a second heat exchange pipe 392 disposed in the water chamber 362, and a third heat exchange pipe 393 (discharge pipe) guiding the wash water, which has exchanged heat while flowing through the second heat exchange pipe 392, into the sump 10, at the outside of the water supply unit 360. The first heat exchange pipe 391 defines a supply passage and the third heat exchange pipe 393 defines a discharge passage.

The state of the wash water flowing through the heat exchange pipe 390 is described. The wash water in the first heat exchange pipe 391 is in a state before heat exchange, the wash water in the second heat exchange pipe 392 is in a state where heat is being exchanged with the water in the water chamber 362, and the wash water in the third heat exchange pipe 393 is a state after heat exchange is completed.

In the embodiment, the second heat exchange pipe 392 may bend one or more times in order to improve the heat exchange efficiency between the water in the water chamber 362 and the wash water flowing through the heat exchange pipe 390. For example, the second heat exchange pipe 392 bends several times in FIG. 19. Further, at least a portion of the second heat exchange pipe 392 may be disposed zigzag, for example.

Further, the second heat exchange pipe 392 is arranged such that water can uniformly flow inside the entire water chamber 362 in order to improve heat exchange efficiency between the water in the water chamber 362 and the wash water flowing through the heat exchange pipe 390.

The heat exchange pipe 390 passes through one side (for example the bottom 362a) of the water chamber 362 into the water chamber 362, and passes through one side (for example the bottom 362a) of the water chamber 362 to the outside. Further, the heat exchange pipe 390 may be made of a material having high thermal conductivity, for example copper or aluminum.

The water chamber 362 may have one or more supports 362b that support the heat exchange pipe 390. The supports 362b can prevent the heat exchange pipe 390 from sagging.

Although it is described in the embodiments that the wash water that has exchanged heat directly collects into the sump, the wash water that has exchanged heat may collects into the sump after flowing into the tub, (indirectly collects into the sump).

What is claimed is:
1. A dish washer comprising:
a tub that defines a space for washing dishes;
a water supply unit having a frame configured to form a water chamber where water supplied from the outside collects, to wash the dishes;
a sump that is supplied with water from the water chamber and supplies wash water into the tub;
a heat exchange passage through which the wash water from the sump flows and exchanges heat with the water in the water chamber while flowing,
a drain pump that discharges the wash water in the sump; and
a drain passage through which the wash water discharged by the drain pump flows, wherein the water supply unit includes:
a communicating passage that communicates with an outside of the tub or an outside of the dish washer, and the communicating passage is disposed in the frame, and
a communicating hole that communicates with the tub and is disposed on the frame, and the communicating hole communicates with the communicating passage,
wherein the communicating passage is separated and partitioned from the water chamber by a wall in the frame of the water supply unit,
wherein the communicating passage is separated from the heat exchange passage,
wherein the wash water discharged from the heat exchange passage is collected at the sump, and
the wash water discharged by the drain pump is discharged to outside of the dish washer without passing through the water supply unit.

2. The dish washer according to claim 1, wherein a supply passage, which is disposed outside the water supply unit and supplied with the wash water from the sump, is connected to a first side of the heat exchange passage,
the heat exchange passage is disposed inside the water supply unit, and
a discharge passage through which the wash water, which has exchanged heat while flowing through the heat exchange passage, is connected to a second side of the heat exchange passage.

3. The dish washer according to claim 1, wherein a portion of the heat exchange passage bends one or more times in the water supply unit.

4. The dish washer according to claim 1, wherein a separator that separates the water chamber from the heat exchange passage is disposed in the water supply unit.

5. The dish washer according to claim 1, wherein guides that form the heat exchange passage are disposed in the water supply unit.

6. The dish washer according to claim 1, wherein at least a portion of the water chamber bends one or more times.

7. The dish washer according to claim 1, wherein a flow direction of the water in the water chamber is different from a flow direction of the wash water flowing through a portion of the heat exchange passage where heat is exchanged with the water in the water chamber.

8. The dish washer according to claim 1, wherein at least a portion of the heat exchange passage and at least a portion of the water chamber extend in parallel in the water supply unit.

9. The dish washer according to claim 1, further comprising a wash pump that pumps up the wash water in the sump,
wherein the wash water in the sump flows through the heat exchange passage by pumping force of the wash pump.

10. The dish washer according to claim 1, further comprising:
a wash pump that pumps up the wash water in the sump for washing;
a guide pipe that connects the sump to the wash pump;
a supply passage that connects the guide pipe with the heat exchange passage; and
a heat exchange pump that pumps up the wash water to the heat exchange passage.

11. The dish washer according to claim 1, wherein water is supplied into the water chamber in a specific operation, or before draining is performed after the specific operation is completed.

12. The dish washer according to claim 1, wherein the wash water in the sump flows into the heat exchange passage in a specific operation, or before draining is performed after the specific operation is completed.

* * * * *